United States Patent
Paterra et al.

(10) Patent No.: US 12,463,718 B1
(45) Date of Patent: Nov. 4, 2025

(54) MOBILE GROUND STATION PROCESSING OF SATELLITE SENSOR DATA

(71) Applicant: Amazon Technologies, Inc., Seattle, WA (US)

(72) Inventors: Frank Paterra, Oakton, VA (US); Cody Planteen, Denver, CO (US)

(73) Assignee: Amazon Technologies, Inc., Seattle, WA (US)

( * ) Notice: Subject to any disclaimer, the term of this patent is extended or adjusted under 35 U.S.C. 154(b) by 327 days.

(21) Appl. No.: 18/338,873

(22) Filed: Jun. 21, 2023

(51) Int. Cl.
*H04B 7/185* (2006.01)
*H04B 1/00* (2006.01)

(52) U.S. Cl.
CPC ....... *H04B 7/18586* (2013.01); *H04B 1/0003* (2013.01); *H04B 7/18517* (2013.01)

(58) Field of Classification Search
CPC .............. H04B 7/18586; H04B 1/0003; H04B 7/18517
USPC ......................................................... 455/430
See application file for complete search history.

(56) References Cited

U.S. PATENT DOCUMENTS

| | | | | |
|---|---|---|---|---|
| 5,913,164 A | * | 6/1999 | Pawa ...................... | H04W 4/18 455/406 |
| 10,567,948 B1 | * | 2/2020 | Baxley ................. | H04B 17/318 |
| 10,778,325 B2 | * | 9/2020 | Haley ................. | H04B 7/18513 |
| 2001/0012775 A1 | * | 8/2001 | Modzelesky ......... | H04W 12/06 455/430 |
| 2013/0322326 A1 | * | 12/2013 | Medina .................. | H04B 15/02 370/317 |
| 2017/0103204 A1 | * | 4/2017 | Mitola, III .............. | G06F 21/74 |
| 2018/0337696 A1 | * | 11/2018 | Talty ..................... | H04B 1/0053 |
| 2019/0238265 A1 | * | 8/2019 | Everett ............. | H03M 13/2903 |
| 2021/0119848 A1 | * | 4/2021 | Ibars Casas .......... | H04L 1/0052 |
| 2021/0320825 A1 | * | 10/2021 | Banuli Nanje Gowda .................. H04L 25/03159 |
| 2022/0231701 A1 | * | 7/2022 | Furtek ................. | H03M 13/616 |
| 2022/0276914 A1 | * | 9/2022 | Kundu .................. | G06F 9/4881 |
| 2024/0129751 A1 | * | 4/2024 | Belgiovine ........... | H04W 16/28 |
| 2024/0179031 A1 | * | 5/2024 | Delfeld ................ | H04B 7/0617 |

FOREIGN PATENT DOCUMENTS

| | | | | |
|---|---|---|---|---|
| CA | 2216033 C | * | 3/2000 | ......... H04B 7/18515 |
| CN | 114650087 B | * | 1/2025 | ........... H04B 7/0452 |
| WO | WO-2015094203 A1 | * | 6/2015 | ........... H04N 21/426 |
| WO | WO-2021211943 A1 | * | 10/2021 | ........ H04W 56/0015 |

* cited by examiner

Primary Examiner — Mahendra R Patel
(74) Attorney, Agent, or Firm — Nicholson DeVos Webster & Elliott LLP

(57) ABSTRACT

Techniques for processing of satellite sensor data by a mobile ground station are described. A satellite transmission from a tasked satellite is received by a mobile ground station, the satellite transmission including unprocessed downlink data. A software-defined radio (SDR) definition associated with a tasked satellite is selected from a plurality of SDR definitions stored by the mobile ground station. A sensor data processing (SDP) application associated with the tasked satellite is selected from a plurality of SDP applications stored by the mobile ground station. An SDR application is executed to extract the collected sensor data from the unprocessed downlink data, the SDR application is loaded with the selected SDR definition. The selected SDP application is executed to generate a product from the collected sensor data. The product is caused to be displayed on a display device.

18 Claims, 8 Drawing Sheets

MOBILE GROUND STATION PROCESSING OF SATELLITE SENSOR DATA

BACKGROUND

Earth observation satellites provide a variety of information for use by individuals and organizations within business, scientific, and/or governmental communities, amongst others. Such satellites are often positioned in low earth orbits (LEO), medium earth orbits (MEO), or geostationary earth orbits (GEO), depending on application. Some satellites may have passive measurement capabilities, such as sensors to measure visible light, radio, microwave, infrared, or other energy, while other satellites may have active measurement capabilities such as synthetic aperture radars (SAR) that measure returns of energy emitted from the satellite itself.

BRIEF DESCRIPTION OF DRAWINGS

Various examples in accordance with the present disclosure will be described with reference to the following drawings.

DETAILED DESCRIPTION

Figure 1:
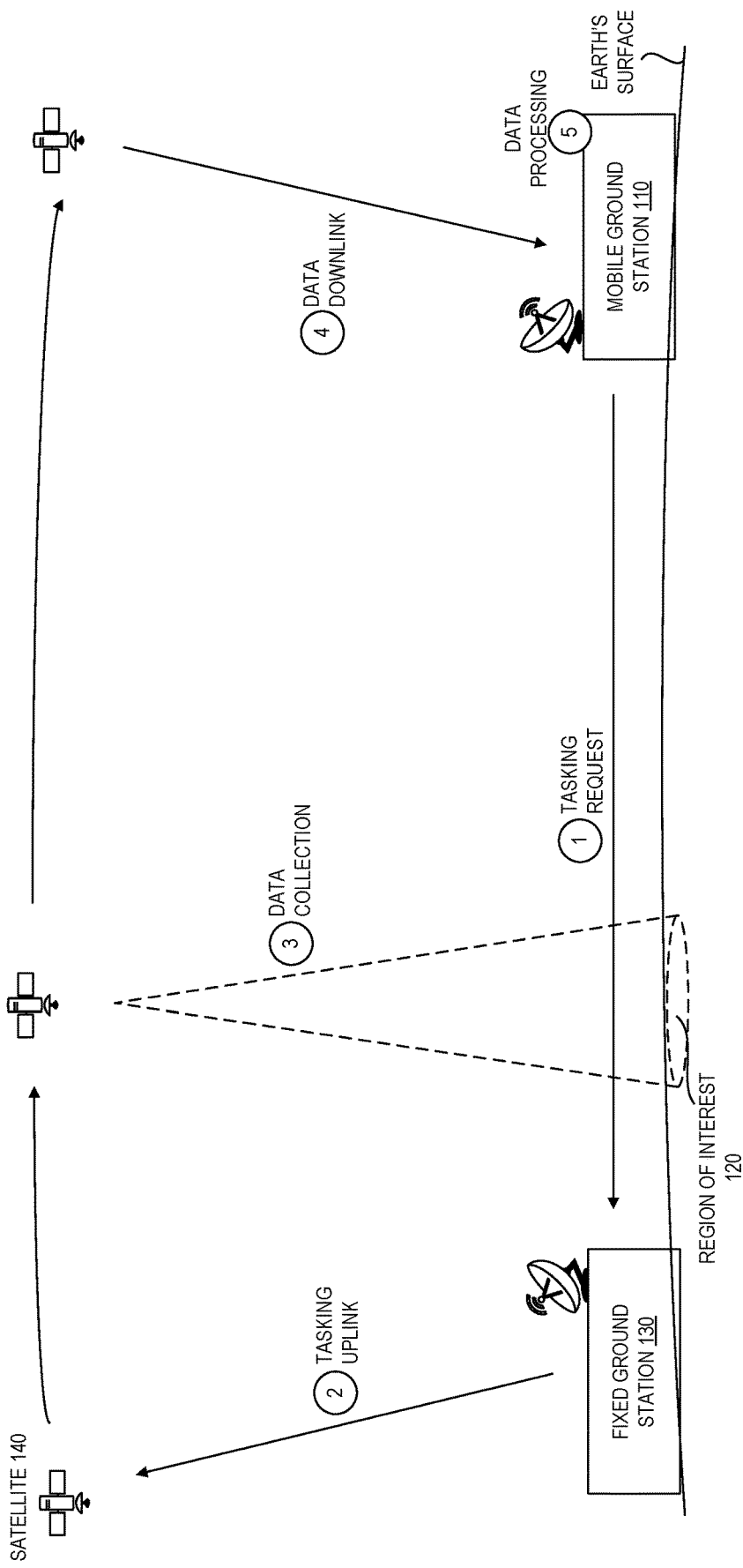
FIG. 1 illustrates aspects of an environment for the processing of satellite sensor data by a mobile ground station data according to some examples.

The present disclosure relates to methods, apparatus, systems, and non-transitory computer-readable storage media for the processing of satellite data by a mobile ground station. According to some examples, a mobile ground station includes multiple software-defined radio (SDR) definitions and multiple satellite sensor data processing (SDP) applications to support receipt and processing of satellite sensor data from different satellites and/or different satellite service providers. The mobile ground station provides users with the ability to receive satellite sensor data and then to locally process the received sensor data (sometimes referred to as instrument data) into a form for a user. In some examples, the mobile ground station provides users with the ability to remotely task satellites to collect sensor data collection over a region of interest and subsequent transmit the collected data to the mobile ground station where it can then be processed. Such a tasking request can include an identification of the region(s) of interest and of the location(s) for transmission of the collected data via satellite downlink. The mobile ground station provides these and other capabilities in field locations disconnected from or with limited connectivity to typical terrestrial networks (e.g., the Internet). Exemplary field locations include scientific research locations, with military personnel in deployed environments, aboard naval vessels, etc. Such field locations commonly have intermittent connectivity and/or limited communications bandwidth to the outside world.

Certain circumstances may limit the viability of receiving and processing satellite sensor data at a typical, connected location prior to transmitting it to a user in a disconnected field location with a limited, possibly intermittent, bandwidth communications channel. For example, certain sensor data requests may be time sensitive, limiting or prohibiting the transmission of processed sensor data via a low-bandwidth communications channel (relative to the data transfer rate between a satellite and a mobile ground station deployed into a field location). As another example, the processed satellite sensor data may be larger than the raw or unprocessed sensor data, such as in the case of SAR applications, further reducing the viability of data processing in one location and then the subsequent transmission of the processed data to the field location. Additionally, processing of the sensor data at a location distant form the field location may limit the ability of users to manipulate the sensor data locally without introducing additional round-trip communications delays via the low-bandwidth communications channel. For example, the initial transmission to the field location may include a certain set of imagery data. A need to overlay the imagery data on a different map or with data from another satellite sensor may cause additional delays as the request and subsequent receipt of the desired imagery are carried out via the low-bandwidth communications channel. The mobile ground station solves these technical problems receipt of the satellite sensor data for local processing at fielded locations. In doing so, the mobile ground station reduces the delay associated with receiving usable satellite sensor data previously experienced by users at such locations.

In some examples, the mobile ground station includes multiple software-defined radio (SDR) definitions to support downlink transmissions from different satellite service providers. Different satellites often have different protocols for their downlink communications. The multiple SDR definitions allow the mobile ground station to support a variety of satellite service providers depending on the sensor data needed by the user. Users are thus able to obtain many different types of sensor data, such as microwave sensor data from a weather satellite service provider, visual image data from an imaging satellite service provider, radar data from a synthetic aperture radar (SAR) satellite service provider, etc.

In some examples, the mobile ground station includes one or more applications to process the received satellite sensor data into a payload consumable by a user. While that payload is typically a form of imagery, other payloads may be generated by the processing (e.g., event or emissions detection, such as whether radiofrequency (RF) transmissions are detected at the region of interest). As one example sensor data processing, satellite imagery data taken from satellites in different orbits may require different transformations (e.g., scaling, projections, etc.) prior to being displayed to the user. One application can perform the transformations on the received satellite imagery to adjust for orbits and generate imagery for display to a user. As another example of sensor data processing, unprocessed SAR data requires additional processing to synthesize imagery. Another application can perform the transformations to synthesize imagery from the unprocessed SAR data.

In some examples, the tasking request is transmitted from a different location than the mobile ground station (e.g., to limit transmissions from the field site). In such cases, the mobile ground station provides for the downlink of data collected by a tasked satellite and subsequent processing operations.

In some examples, the mobile ground station includes specialized hardware, often in the form of multiple processors, to support the computational requirements of satellite sensor data processing. The processors can include graphical processing units (GPUs) and/or field programmable gate arrays (FPGAs) that can perform signal processing operations (including the processing of satellite transmissions and sensor data, for example) at a higher throughput as compared to a general-purpose processor. The mobile ground station software environment can include a systems manager to manage the receipt and processing of satellite sensor data. The systems manager can also manage the transmission of tasking requests.

FIG. 1 illustrates aspects of an environment for the processing of satellite sensor data by a mobile ground station according to some examples. In this example, a mobile ground station 110 (or mobile earth station) remotely initiates satellite taskings via a fixed ground station 130 (or fixed earth station). Mobile ground stations can take on a variety of forms depending on size, weight, and power constraints often dictated by the targeted use case (e.g., whether carried by a person or installed on a land-based vehicle, a small naval vessel, or a large ship, etc.). A fixed ground station provides for communications with space-based platforms such as earth observation satellites, but generally at a fixed location (e.g., sited at a facility often with a communications license associated with that site).

Ground stations includes the radio frequency equipment to communicate with those platforms. Different satellite providers typically operate in a specific radio band such as Ka, Ku, K, V, etc. using assigned frequency ranges. The ground station facilitates communications to different satellites using their assigned range(s).

At a high level, a mobile ground station such as mobile ground station 130 includes one or more processors and memory to execute SDR and SDP applications. In some examples, the mobile ground station may provide interfaces to connect RF communications equipment (e.g., coaxial connectors), other input devices (e.g., input devices such as a keypad, mouse and keyboard, touchscreen, etc.) and other output devices (e.g., display devices). In other examples, the radiofrequency communications equipment, input device(s), and/or output device(s) are integrated into the mobile ground station. In other examples, the mobile ground station can provide for the wired or wireless connection of another device including input and/or output devices (e.g., a laptop, smartphone, tablet, etc.) through which a user can control the mobile ground station. Additional details about the hardware of an exemplary mobile ground station are illustrated in and described with reference to FIG. 5.

In some examples, the fixed ground station 130 may be part of a global network of ground stations to facilitate communications with a given satellite regardless of the satellite's position in its orbit. The network of ground stations may include multiple ground stations spread across the globe such that a client satellite is in range (or will be in range momentarily) of at least one ground station of the network.

In some examples, the network of ground stations is part of a ground station service of a provider network. The ground station service provides network connectivity to multiple ground stations spread across the globe. A provider network (sometimes referred to as a "cloud" provider network or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time. This compartmentalization and geographic distribution of computing hardware enables the cloud provider network to provide low-latency resource access to users on a global scale with a high degree of fault tolerance and stability, including in support of the ground station service.

In some examples, the mobile ground station 110 can be considered an "edge" location of the provider network. For example, a cloud provider network typically includes a physical network (e.g., sheet metal boxes, cables, rack hardware) referred to as the substrate. The substrate can be considered as a network fabric containing the physical hardware that runs the services of the provider network. In the case of the mobile ground station, the provided compute capacity can serve as an edge device having low-bandwidth and/or intermittent connectivity to the cloud. The AWS Snow Family is an example of one family of such edge devices.

An exemplary process flow of the remote tasking, collection, receipt, and processing of satellite sensor data is now described with reference to the circled numbers 1 through 5. At circle 1, the mobile ground station 110 transmits one or more messages forming a satellite tasking request (or just "tasking request") via a first communications path. An exemplary tasking request includes an identification of a region of interest for a satellite sensor data collection and an identification of a location where the satellite should transmit the collected data (also referred to herein as the "downlink location"). The region of interest may be identified with a series of coordinates (e.g., a set of latitude and longitude coordinates specifying an area on the earth's surface, a center and radius, etc.). Likewise, the downlink location can be specified as a latitude and longitude, which may be the current location of the mobile ground station 110 or an expected location of the mobile ground station 110 at a future point in time. The location at the future point in time may be estimated based on average tasking delays or negotiated based on expected tasking delays via communications over the first communications path. Note that the downlink location may be an approximation itself (e.g., again specified as a region on the earth's surface with a set of coordinates, a center location and radius, etc.).

A tasking request can further include a receiver identifier associated with the mobile ground station 110. The satellite provider can instruct the satellite to encrypt the downlink based on the receiver identifier.

Although not shown, an intermediate service between the mobile ground station 110 and the fixed ground station 130 may receive the tasking request, perform validation(s) of the request, and transmit a tasking response to the mobile ground station 110. Additional details of validations and a tasking response are described with reference to FIG. 2.

A tasking request can further include an identification of desired sensor data. Such an identification may be specific to a particular satellite provider or satellite of a satellite provider or generalized to a particular type of sensor data. For example, one tasking request may identify "Satellite Provider A," such as where satellite provider A provides particular services (e.g., weather satellites, visual image satellites, terrain mapping satellites, etc.). Another example tasking might identify "Satellite X" of "Satellite Provider A" where that particular satellite has a certain desired capability by a user of the mobile ground station 110. Yet another example tasking might identify characteristics of the sensor data to collect, such as a frequency band (e.g., infrared, microwave, etc.) or a category (e.g., SAR data, weather data, etc.), leaving it up to a downstream tasking service to identify a particular satellite provider and/or satellite to provide the requested data.

At circle 2, the fixed ground station 130 transmits a satellite tasking via an uplink to a satellite 140. The satellite tasking can include an indication of the region of interest from which to collect sensor data and an indication of the downlink location. In some examples, the fixed ground station 130 or an intermediate device between the mobile ground station 110 and the fixed ground station 130 (not shown) transforms the locations in the tasking request into another coordinate system, such as from latitude and longitude to Earth-centered Earth-fixed (ECEF) coordinates.

Additional details related to the tasking request and satellite tasking communications are illustrated in and described with reference to FIG. 2.

Note that the first communications path typically provides for non-line-of-sight communications between the mobile ground station 110 and the fixed ground station 130, and may include multiple networks (e.g., a first wireless network connected to a second wired network). A computing device (not shown) including a receiver for the first communications path typically receives the message(s) forming the tasking request. For example, the first communications path can be RF transmissions from the mobile ground station 110 to a line-of-sight receiver coupled to a computer system that subsequently routes the request to the fixed ground station 130 via a terrestrial computer network. Similarly, the first communications path can be RF transmissions from the mobile ground station 110 to a communications satellite (not shown) that subsequently routes the request to the fixed ground station 130 or to another ground station (not shown) coupled to a computer system that that routes the request to the fixed ground station 130 via a terrestrial computer network. As another example, the first communications path can be transmissions over a terrestrial radio network. For example, short-wave radio communications can propagate to a non-line-of-sight receiver via atmospheric propagation, with a computer system coupled to the receiver at a terminus of the radio network subsequently routing the request to the fixed ground station 130 via a terrestrial computer network. Although the above examples refer to a terrestrial computer network, the first communications path receiver may be integrated with the fixed ground station 130 such that the request is transmitted between the first communications path receiver and the satellite antenna for uplink via a communications bus. In addition to those described above, other communications paths variants can be used to relay the tasking request as will be appreciated by those skilled in the art.

At circle 3, the satellite collects data per its tasking as it passes over the region of interest 120. For example, the satellite can measure the response from active transmissions (e.g., SAR) or measure passive emissions using various sensors (e.g., visible light, radio, microwave, infrared, or other energy sensors).

At circle 4, the tasked satellite 140 transmits the collected data via a downlink to the mobile ground station 110 as it passes over the downlink location (which may be different than where the mobile ground station 110 was located at the time of transmitting the tasking request) via a second communications path. Note that the second communications path providing the downlink between the satellite 140 and the mobile ground station 110 is typically a higher bandwidth than the first communications path that was used to transmit the tasking request. In some examples, at least a portion of the collection of data by the satellite and the transmission of collected data by the satellite to the mobile ground station may occur concurrently (e.g., when the region of interest 120 and the downlink location are within proximity such that a passing satellite is in communication range with the mobile ground station 110 during data collection). In such cases, the satellite can transmit collected sensor data to the mobile ground station prior to completing the data collection portion of the tasking.

At circle 5, the mobile ground station 110 processes the received data. Such data processing operations can include SDR processing operations to obtain the unprocessed sensor data from the downlink transmission and SDP operations to transform or synthesize the unprocessed sensor data into a form for use by a user. Such SDR operations can include decoding the transmission (e.g., applying error correction), separating transmission channels (e.g., if multiple), extracting data from transmission frames (e.g., based on the satellite or satellite provider protocols), and the like to obtain or extract the unprocessed sensor data from the downlink transmission. The unprocessed sensor data can include both measurements and metadata indicating the conditions of the measurements. Such metadata can include, for example, an identification of the sensor parameters and/or characteristics used to collect the data, the location(s) of the measurements, the time(s) of the measurements, the format of the data, etc. Sensor data processing operations can include transforming or synthesizing the unprocessed sensor data to generate a consumable payload such as imagery or emissions detection indicators of the region of the interest.

Additional details related to the data processing operations are illustrated in and described with reference to FIG. 6.

Figure 2:
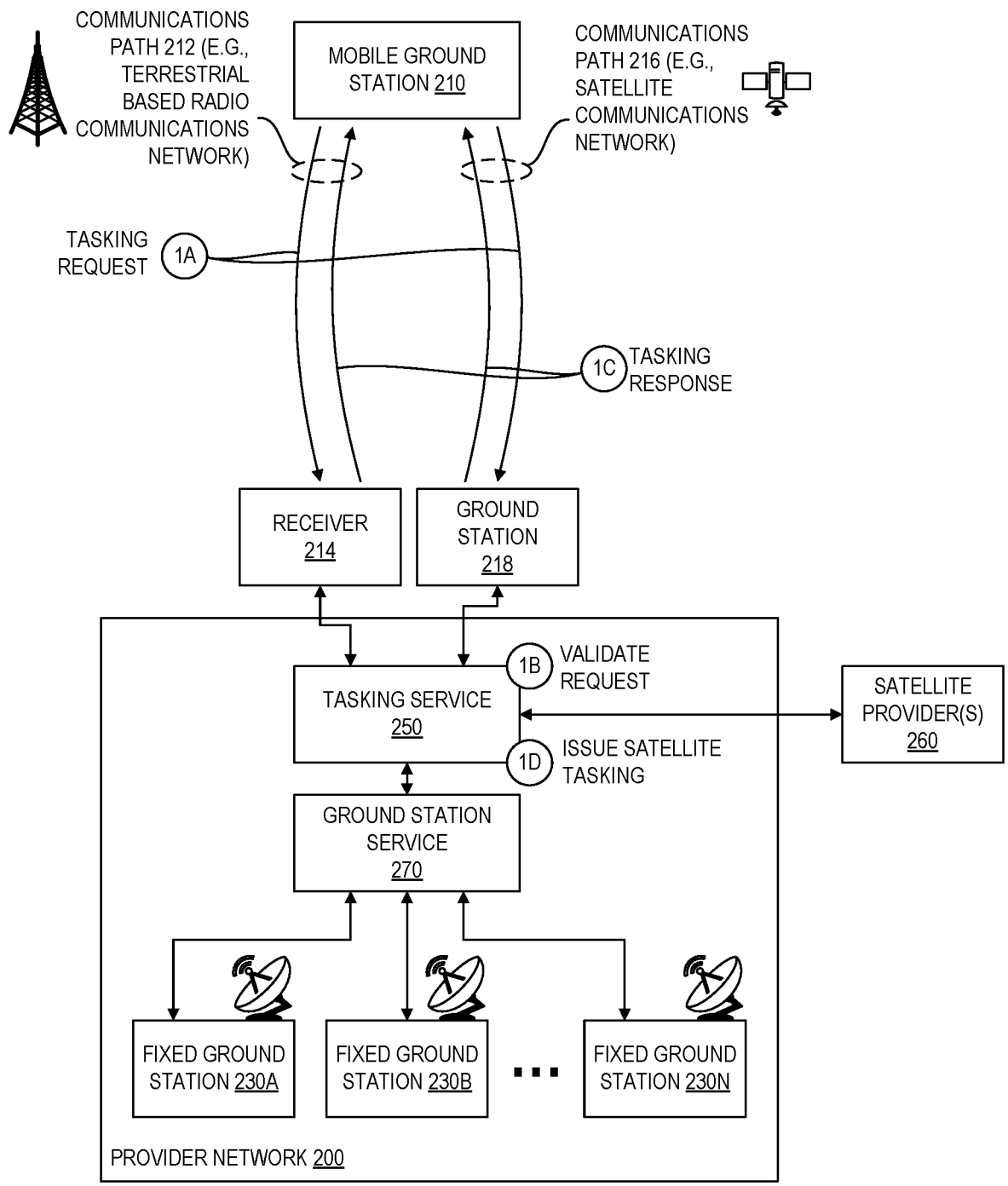
FIG. 2 illustrates aspects of a tasking request according to some examples.

FIG. 2 illustrates aspects of a tasking request according to some examples. As described above, a tasking request transmitted by a mobile ground station can take various communications paths between a mobile ground station and a fixed ground station before transmission by the fixed ground station as a satellite tasking to a satellite. Two are illustrated. Communications path 212 is a terrestrial-based radio communications network between a mobile ground station 210 and a receiver 214. Communications path 216 is a satellite communications network between the mobile ground station 210 and a ground station 218.

At circle 1A, the mobile ground station 210 transmits one or more mobile ground station 110 transmits one or more messages forming a tasking request via a first communications path such as paths 212 or 216. Again, the tasking request can include an identification of the location of the region of interest, the approximate downlink location, and can also include an identification of the desired sensor data, either by way of an identification of a particular satellite, satellite provider, or sensor characteristics.

A computer system associated with another end of the communications path (e.g., at receiver 214 or ground station 218) can submit the request to the tasking service 250 to a tasking service 250, typically via an application programming interface (API). The tasking service 250 of a provider network 200 can vend an API through which tasking requests can be submitted. An API refers to an interface and/or communication protocol between a client and a server, such that if the client makes a request in a predefined format, the client should receive a response in a specific format or initiate a defined action. In the case of communications path 212, the receiver 214 or a computer system thereof acting as a client can submit a received tasking request to the tasking service 250. In the case of communications path 216, the ground station 218 or a computer system thereof acting as a client can submit a received tasking request to the tasking service 250. Note that the tasking request may change formats as it traverses over various networks, but the contents such as the region of interest, downlink location, and other satellite-related parameters are typically preserved in some representation (e.g., due to coordinate transformations, satellite data lookups, etc.).

At circle 1B, the tasking service 250 validates the request. Validation operations can include validating the request with a satellite provider 260, typically via an API vended by a computer system of the satellite provider 260. Validation with a satellite provider 260 typically involves requesting and reserving satellite sensor time (for sensor time on the satellite while passing over the region of interest) and downlink time (for transmission of the sensor data from the satellite to the mobile ground station 210). For example, the tasking service 250 can send a request to the satellite provider 260 including an identification of the region of interest and of the downlink location. The tasking service 250 can receive a response from the satellite provider 260 that provides an identification of one or more satellite options that can satisfy the request, the options corresponding to satellites that can perform the data collection and transmit the collected data to the downlink location. Based on the response, the tasking service 250 can reserve one of the options.

In examples where the tasking request included sensor data characteristics, the tasking service 250 can have access to a database of satellite providers, their satellites, and those satellites' capabilities. Using that database, the tasking service can identify which satellite(s) and/or satellite provider(s) can service the request. The tasking service 250 can then query the identified satellite provider(s) 260 to determine which satellite can fulfill the request given its parameters (e.g., can be reserved to collect and transmit sensor data). Selecting one, the tasking service 250 can reserve the satellite time (sensor and downlink time) with the satellite provider 260.

Once satellite time has been reserved, the tasking service 250 can issue a satellite tasking to a ground station service 270 of the provider network 200. The satellite tasking can include an identification of the region of interest, an indication of the measurement to take (e.g., if the satellite carries multiple sensors), and the downlink location. The ground station service 270 manages fixed ground stations 230A-230N. The ground station service 270 can identify and a fixed ground station 230 in the path of the satellite having the reservation with available uplink time to transmit the satellite tasking. Note that the uplink time to the satellite may also be coordinated between the ground station service 270 and the satellite provider 260. The selected fixed ground station 230 can transmit the satellite tasking to the satellite associated with the reservation as indicated at circle 2 of FIG. 1.

In some examples, the tasking service 250 can transmit a tasking response to the mobile ground station 210 as indicated at circle 1C, typically via the same communications path used to transmit the tasking request (e.g., if the tasking request was sent via communications path 212, the tasking response is sent via communications path 212). An exemplary tasking response can include an indication of whether the tasking request was able to be fulfilled and, if so, an information about the satellite that will fulfill the request and an approximate downlink time (which may be provided as a window such as during one or more overhead passes). The information about the satellite can include a satellite identifier, an indication of the satellite's orbit, and/or communications protocol data for the downlink. The mobile ground station 210 can use the information in the tasking response to locate the satellite as it passes overhead and to receive the downlink during the downlink time.

Although in the illustrated the receiver 214 and the ground station 218 are illustrated as outside of the provider network 200, in other examples one or both may be part of the provider network 200 (e.g., the ground station 218 as part of the network of ground stations provided by the ground station service 270).

Figure 3:
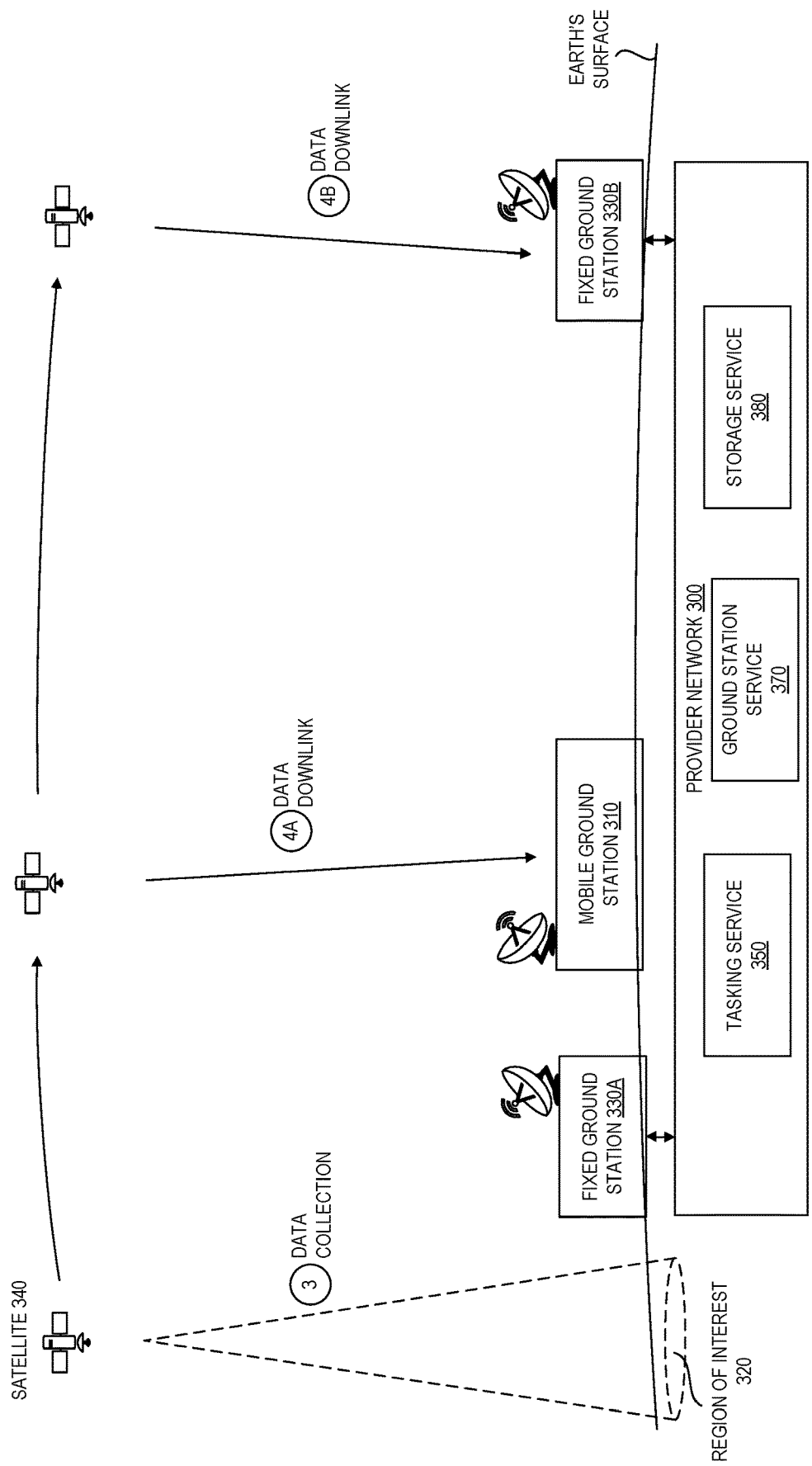
FIG. 3 illustrates aspects of a satellite downlink according to some examples.

FIG. 3 illustrates aspects of a satellite downlink according to some examples. In some scenarios, it may be desirable to store the collected sensor data in another location, often due to the cost of the data collection and/or to make it available to personnel without access to the mobile ground station. In some examples, the mobile ground station can include an indication in the tasking request (e.g., transmitted at circle 1 of FIG. 1, circle 1A of FIG. 2) to store the collected sensor data at a second location. In other examples, a user can configure the tasking service 350 to automatically coordinate a second downlink to store the collected sensor data at a second location (e.g., rather than include it in the tasking request transmitted by a mobile ground station). An exemplary second location is a storage service 380 of a provider network 300. One such storage service is AWS S3.

The tasking service 350 can include a second downlink location as part of its validation operations with a satellite provider. For example, the tasking service 250 can request the identification of one or more second downlink locations from a ground station service 370, the second downlink locations in the form of ground stations of a provider network 300 that can communicate with the tasked satellite 340 along its orbit as or after the satellite collects the sensor data from the region of interest 320 (at circle 3) and before or after (or even during) the downlink to the mobile ground station 310 (at circle 4A). As illustrated, the ground station service 370 can identify fixed ground stations 330A and 330B as candidates for the second downlink. The tasking service 250 can negotiate downlink time with the satellite provider (not shown) for the second downlink to one of the candidates, in this case reserving downlink time overhead of fixed ground station 330B. In issuing the satellite tasking to the ground station service 370, the tasking service 350 can include the additional operations of transmitting the collected sensor data at the second downlink, in this case overhead of fixed ground station 330B as indicated at circle 4B.

The tasking service 250 can further send a request to the ground station service 370 to cause the ground station service 370 to store the satellite transmission received by the fixed ground station 330B with the storage service 380. Upon receipt of the transmission, the fixed ground station 330B can store the received transmission in with the storage service 380, typically at a location designated by a user (e.g., as part of configuring default secondary storage with the tasking service 350 or included in the tasking request transmitted from the mobile ground station).

Figure 4:
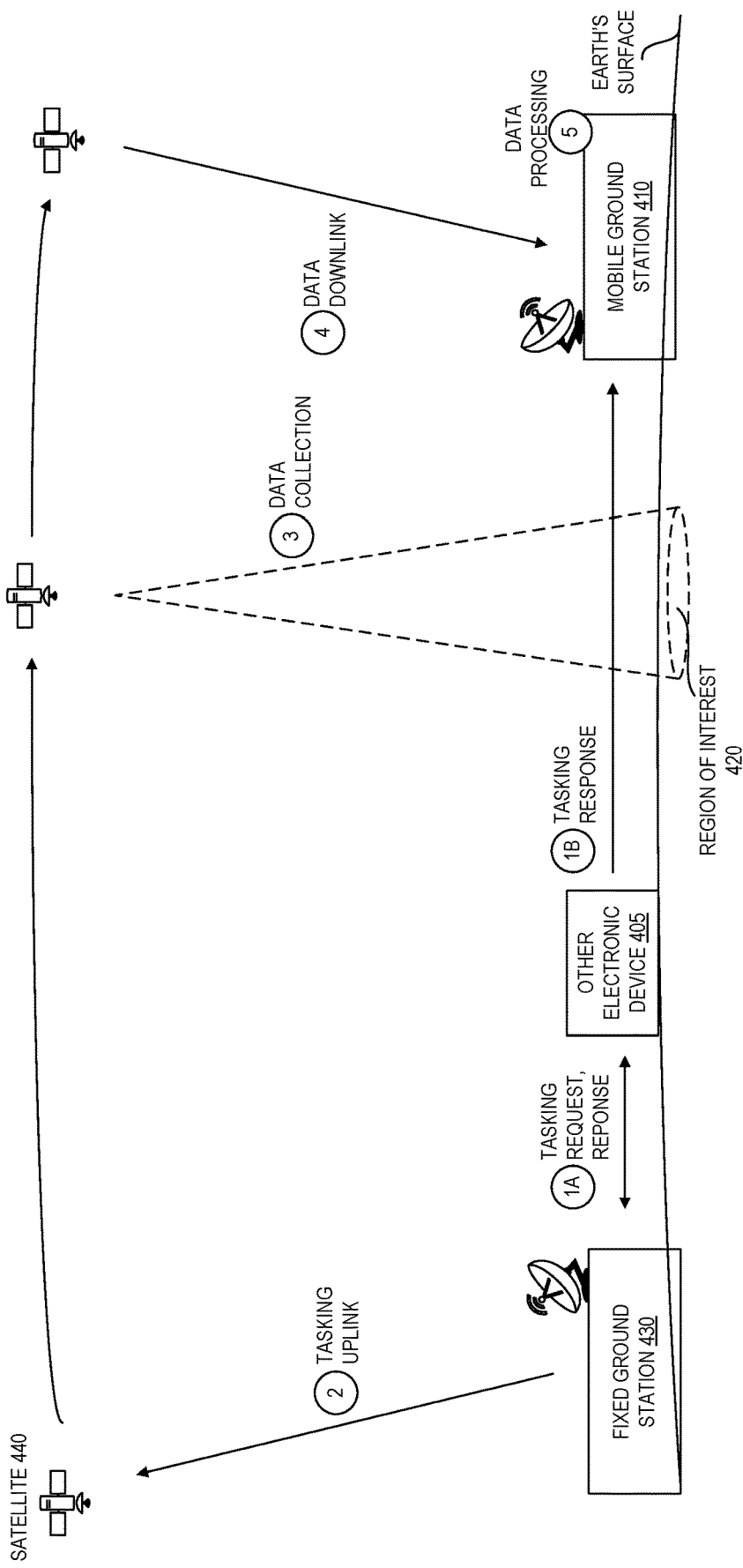
FIG. 4 illustrates aspects of another environment for the processing of satellite sensor data by a mobile ground station according to some examples.

FIG. 4 illustrates aspects of another environment for the processing of satellite sensor data by a mobile ground station according to some examples. In order to limit the emissions from a field location in which a mobile ground station is deployed, in some examples the tasking request may be transmitted from another location, such as from another electronic device 405. An exemplary process flow for this case is now described with reference to the circled numbers 1 through 5. At circle 1A, an electronic device 405 remote from the mobile ground station 410 transmits one or more messages forming a satellite tasking request (or just "tasking request") to the fixed ground station 430 (or intermediate service such as illustrated in FIG. 2). As before, an exemplary tasking request includes an identification of a region of interest for a satellite sensor data collection and an identification of a location where the satellite should transmit the collected data (also referred to herein as the "downlink location"). The tasking request can further include a receiver identifier associated with the mobile ground station 410. The satellite provider can instruct the satellite to encrypt the downlink based on the receiver identifier.

As described with reference to FIG. 2, an intermediate service between the other electronic device 405 and the fixed ground station 430, such as the tasking service 250, may receive the tasking request, perform validation(s) of the request, and transmit a tasking response to the other electronic device 405. The other electronic device can then send the tasking response to the mobile ground station 410 via a communications path such as those described above (e.g., for the transmission of a tasking request/response as described with reference to FIG. 2). In this manner, the mobile ground station 410 passively receives communications (either from a tasked satellite or from the other device 405 without transmitting to initiate the tasking).

Operations at circles 2 through 5 of FIG. 4 are similar to those described above with reference to FIG. 1.

Figure 5:
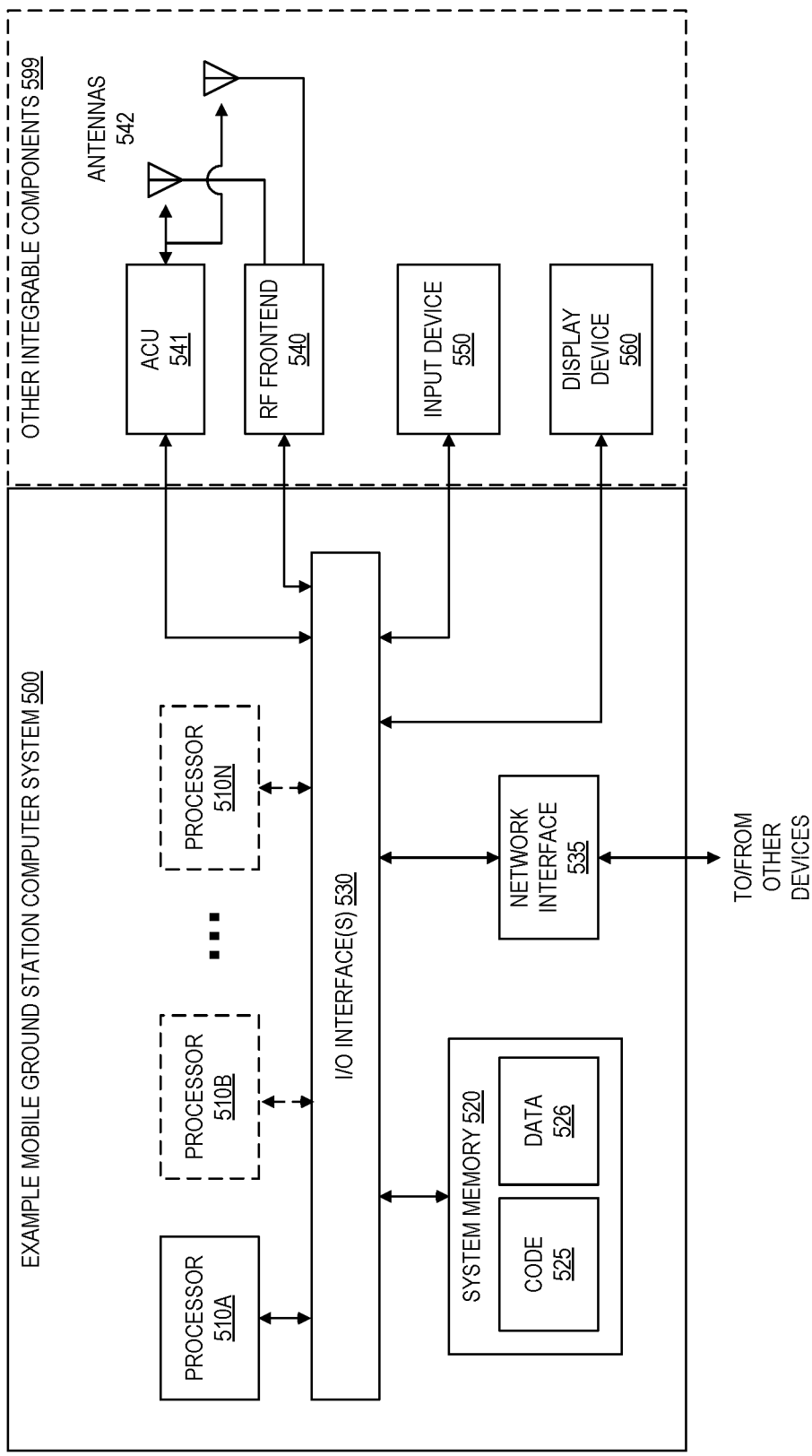
FIG. 5 illustrates aspects of a mobile ground station computer system according to some examples.

FIG. 5 illustrates aspects of a mobile ground station computer system according to some examples. In the illustrated example, the mobile ground station computer system 500 (or computer system 500 for short) includes one or more processors 510 coupled to a system memory 520 via input/output (I/O) interface(s) 530. While FIG. 5 shows the computer system 500 as a single computing device, in various examples the computer system 500 can include one computing device or any number of computing devices configured to work together as a single computer system 500.

In some examples, the computer system 500 is a multi-processor system including several processors 510 (e.g., two, four, eight, or another suitable number). The processor(s) 510 can be any suitable processor(s) capable of executing instructions. For example, in various examples, the processor(s) 510 can be general-purpose or embedded processors implementing any of a variety of instruction set architectures (ISAs), such as the x86, ARM, PowerPC, SPARC, or MIPS ISAs, or any other suitable ISA. In some examples, one or more of the processors 510 is a special-purpose processor such as a graphical processing unit (GPU), field programmable gate array (FPGA), and/or application specific integrated circuit (ASIC).

The system memory 520 can store instructions and data accessible by the processor(s) 510. In various examples, the system memory 520 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described herein, are shown stored within the system memory 520 as code 525 (e.g., executable to implement, in whole or in part, a system manager, SDR application(s), SDP application(s) and other the software components illustrated in FIG. 6) and data 526 (e.g., software-defined radio definitions, unprocessed downlink data, unprocessed sensor data, consumable payload data, etc.).

In some examples, the system memory 520 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 500 via the I/O interface 530. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 500 as the system memory 520 or another type of memory.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In some examples, the I/O interface 530 can be configured to coordinate I/O traffic between the processor 510, the system memory 520, and any other devices, such as a network interface 535, an antenna control unit (ACU) 541, an RF frontend 540, an input device 550, and a display device 560. In some examples, the I/O interface 530 can perform any necessary protocol, timing, or other data transformations to convert data signals from one component (e.g., the system memory 520) into a format suitable for use by another component (e.g., the processor 510). In some examples, the I/O interface 530 can include support for devices attached through various types of peripheral buses, such as a variant of the Peripheral Component Interconnect (PCI) bus standard or the Universal Serial Bus (USB) standard, for example. In some examples, the function of the I/O interface 530 can be split into two or more separate components, such as a north bridge and a south bridge, for example. Also, in some examples, some or all of the functionality of the I/O interface 530, such as an interface to the system memory 520, can be incorporated directly into the processor 510.

In some examples, the computer system 500 includes a network interface 535 coupled to the I/O interface 530. In various examples, the network interface 535 can support communication via any suitable wired or wireless data networks, such as types of Ethernet or WiFi networks, for example. The network interface 535 can be configured to allow data to be exchanged between the computer system 500 and other devices attached to a localized network (such as a network deployed at a forward operating base, a shipboard network, etc.). In some examples, the local network is disconnected from or has limited bandwidth connectivity to a wide area network (WAN), such as the Internet. Note that in this context, "limited" bandwidth refers to the bandwidth relative to the downlink data transfer rate between a sensor satellite and the computer system 500).

In some examples, the RF frontend 540 can be connected to one or more antennas 542 and include a modem and digitizer for communications channels used by the computer system 500, including a communications channel to transmit the tasking request (e.g., if not sent via another device such as illustrated in FIG. 4) and a communications channel to receive the satellite downlink. In the illustrated example, the RF frontend 540 includes two antennas 542. In the satellite downlink communications channel for example, the RF frontend can include a low-noise block downconverter (LNB), typically including a low-noise amplifier and downconverter or mixer, an RF analog-to-digital converter (ADC), and a modem to capture the satellite transmission and store it in data 526 in the system memory 520. The tasking request communications channel can include a modem and RF digital-to-analog converter (DAC) to transmit a tasking request. In cases where the tasking request communications channel is a satellite communications network, the transmit path can further include a block upconverter (BUC) to transmit the request over the satellite network. In some examples, such as where the tasking request is transmitted via a communications satellite, the same antenna 542 may be used for both communications channels with the RF frontend including the modem and DAC/ADC to support bidirectional communications.

In some examples, the input device 550 can include a touch screen, push buttons, touch pad, touch screen, wheel, joystick, keyboard, mouse, keypad, or any other such device or elements whereby a user is able to input command to the computer system 500. The input device 550 can be connected to the computer system 500 via an external port such as a USB port, for example.

In some examples, the display device 560 can be an LED, LCD, or other type display through which a mobile ground station can display interfaces to a user to allow the user to interact with the mobile ground station to issue tasking requests and to view processed imagery. The display device 550 can be connected to the computer system 500 via an external port such as DisplayPort (DP) connector, USB connector, High-Definition Multimedia Interface (HDMI) connector, Digital Visual Interface (DVI) connector, etc.

In some examples, the computer system 500 can include a global positioning system (GPS) receiver or be connected to a GPS receiver via the I/O interface 530. The GPS receiver can provide location information that can be included as part of a tasking request.

In some examples, the ACU 541 provides for the directional control of antenna(s). The computer system 500 can provide the commands (e.g., to a microprocessor as part of the ACU) or signaling (e.g., to perform motor control) to direct the antennas to initially track a passing satellite and to subsequently lock to a downlink transmission.

As indicated, the RF frontend 540, the ACU 541, the input device 550, and/or the display device 560 are other integrable components 599. Such components can be integrated as part of a mobile ground station computer system 500.

In some examples, the input device 550 and the display device 560 may be integrated as part of another device, such as a handheld or portable device (e.g., smartphone, laptop, tablet, etc.). The other computer system may communicate with the computer system 500 via the network interface 535, USB, Bluetooth, etc. In such cases, the computer system 500 may host an application such as a web server that the other computer system can connect to using a protocol such as the Hypertext Transfer Protocol (HTTP). The web server can provide an API through which to issue tasking requests and to view consumable payloads (e.g., imagery and/or other data post-SDP).

In some examples, the RF frontend 540 can be a part of another device, such as other satellite communications equipment available at the field location where the computer system 500 is deployed. In such cases, the other device can receive and digitize the satellite transmission and transmit the received data via a local network to network interface 535 of the computer system 500.

Figure 6:
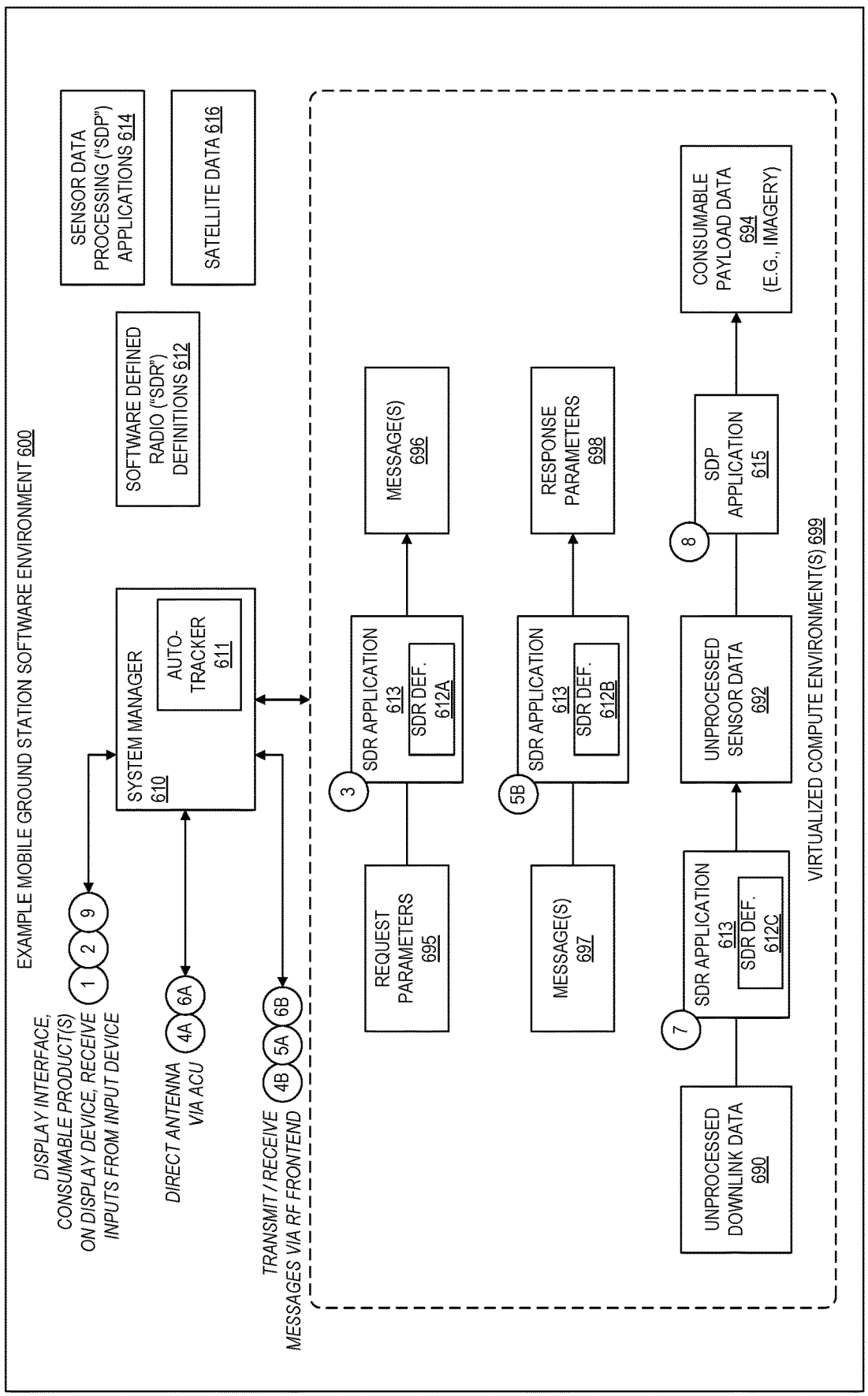
FIG. 6 illustrates aspects of a software environment of an example mobile ground station computer system according to some examples.

FIG. 6 illustrates aspects of a software environment of an example mobile ground station computer system according to some examples. As illustrated, the exemplary software environment 600 includes a system manager 610, software defined radio (SDR) definitions 612, sensor data processing (SDP) applications 614, and satellite data 616. In this example, the system manager 610 manages aspects of transmission of a tasking request (e.g., if performed by the mobile ground station rather than another electronic device), reception of a tasking response, and reception of a satellite downlink transmission. In some examples, the system manager 610 causes the processing of communications in virtualized environments 699 to increase fault tolerance and improve security, such as when the mobile ground station is handling satellite data for different users or organizations.

An SDR application 613 processes data by decoding data carried on received radio signals or encoding data to be transmitted on radio signals, performing operations such as applying error correction, multiplexing or demultiplexing channels, packaging or unpacking the data according to a protocol, etc. The particulars of the operations to send or receive data with a given radio communications path are specified in an SDR definition 612, which can be loaded to an instance of an SDR application 613. The mobile ground station can store multiple SDR definitions 612 in memory to support communications over multiple communications paths, including protocols associated with a first communications path over which a tasking request is transmitted or a tasking response is received, and those associated with a second communications path over which data is received from a tasked satellite.

In the case of transmitting a tasking request over one communications path, an SDR application can encode the message(s) forming the request using an SDR definition 612 associated with that communications path. In the case of receiving a satellite transmission from a tasked satellite over a different communications path, an SDR application can decode the message(s) forming the downlink transmission using an SDR definition 612 associated with that communications path into unprocessed sensor data.

The SDP applications 614 provide the ability to process the unprocessed sensor data, which may be encoded in different formats depending on the tasked satellite and/or satellite provider. The SDP applications 614 can further provide for the subsequent synthesis and/or manipulation of consumable payloads by the mobile ground station. The mobile ground station can store multiple SDP applications 614 in memory to support different consumable payloads.

Consumable payload data typically refers to the product requested via a tasking request. While typically imagery or a form of imagery, other consumable payloads can include indications of the presence of RF emissions within the region of interest, other types of emissions within the region of interest, etc.

Satellite data 616, typically a database, can include data about particular satellites and/or satellite providers, including characteristics such as orbital information, available sensor(s), etc. The system manager 613 can use the satellite data 616 to present consumable payload options to an end-user initiating a tasking request or to initiate tracking of tasked satellites as they pass overhead.

An exemplary process flow of the software operations of a mobile ground station is now described with reference to the circled numbers 1 through 9.

In examples where the tasking request is transmitted from the mobile ground station rather than from another device as illustrated in FIG. 4, at circle 1, the system manager 610 can cause the display of a user interface (e.g., via display device 560 or another device connected via the network interface 535 such as a handheld device, laptop, etc.)) to allow a user to initiate a satellite tasking request. An example graphical user interface is illustrated and described with reference to FIG. 7. In some examples, the displayed information is based on satellite data 616, which may include a list of satellite providers or satellites to which tasking requests can be initiated, their capabilities, etc.

At circle 2, a user can provide information related to a tasking request, represented here as request parameters 695, to the system manager 610 via an input device (e.g., via input device 550 or another device connected via the network interface 535 such as a handheld device, laptop, etc.)). Such parameters can include an identification of a satellite provider, satellite, or observation characteristics associated with the tasking, as well as an identification of a region of interest and downlink location.

At circle 3, the system manager 610 can cause the execution of an SDR application loaded with a SDR definition 612A associated with the communications path over which the tasking request will be sent to generate the tasking request message(s) 696 and store them in memory. Such messages can conform to an RF-based communications protocol associated with the path.

The system manager 610 can cause the message(s) 696 to be transmitted over the first communications path via the RF frontend. In cases where the tasking request is sent via a satellite communications network, the system manager 610 can first direct the ACU to point the antenna at a communications satellite in the network, indicated at circle 4A, followed by transmitting the message(s) 696 as indicated at circle 4B. In cases where a non-directional antenna is used to transmit the request or where the antenna is pre-positioned, the system manager 610 can cause the transmission of the messages 696 indicated at circle 4B.

In examples where the tasking request is transmitted from another device rather than from the mobile ground station, the mobile ground station can await receipt of a tasking response from the other device. Where a satellite communications network is used to transmit the tasking response, the system manager can direct the ACU to point the antenna at a communications network satellite.

At circle 5A, the system manager 610 can receive tasking response message(s), if any, and store the message(s) in memory as messages 697. At circle 5B, the system manager 610 can cause the execution of an SDR application 613 loaded with a SDR definition 612B associated with the communications path over which the tasking response was received to obtain the response parameters 698. Note that the SDR definition 612B may be the same as SDR definition 612A (e.g., in cases where the SDR definition supports bidirectional communications over the path used to transmit a tasking request and receive a tasking response). The system manager 610 can evaluate the response parameters 698 to determine whether the tasking request was successful. If not, such as if a satellite was unable to satisfy the request, the system manager 610 can cause the display of an indication of the failure to the end-user (e.g., via a display or other device device). If the tasking request was successful, operations can proceed as follows.

At circle 6A, the system manager 610 can cause the RF frontend to prepare for receipt of the downlink transmission. This can include causing the satellite antenna to track the tasked satellite as it passes overhead during the downlink period (e.g., often in a larger window before and after the scheduled downlink time). In some examples, the system manager 610 can cause an ACU to track an expected orbit of a tasked satellite as it passes overhead. In some examples, such as if the mobile ground station receives a tasking response that includes an approximate downlink time and approximate initial position of the satellite fulfilling the request, the system manager can direct the antenna controller to track that orbit as the satellite passes overhead. In other examples, satellite data 616 may include orbital information associated with satellites. Based on the tasking request, the system manager 610 can cause the antenna controller to point the antenna associated with the second communications path toward an expected position of the satellite as it comes into view of the mobile ground station.

In some examples, the system manager 610 performs satellite auto-tracking using an auto-tracker 611, such as when the antenna and/or ACU lack auto-tracking capability. In auto-tracking, the auto-tracker 611 causes an ACU to point the receiver antenna toward the satellite as it passes overhead. In some examples, the auto-tracker 611 filters the signal received from an RF frontend to reduce frequencies outside of the carrier band, estimates the signal strength, and uses the estimated signal strength (e.g., a received signal strength indicator or RSSI) to provide a control input in a feedback loop. The control system of the auto-tracker 611 may be referred to as a step-tracking algorithm. By adjusting the position of the antenna via the ACU over time (commonly running at rates in the order of tens or hundreds of times per second), the system manager 610 can operate to maximize the received signal strength and thereby achieve tracking of the satellite as it passes overhead. Note that in other examples, an ACU may have built-in auto-tracking capabilities. In such cases, the system manager 610 can provide the ACU with the orbital information of a satellite, and the ACU perform the tracking operations.

At circle 6B, during the downlink transmission, the system manager 610 stores the incoming satellite transmission as unprocessed downlink data 690 in memory. Other names for the unprocessed downlink data 690 include sample data and DigIF (Digital Intermediate Frequency) data.

At circle 7, the system manager 610 can cause the execution of an SDR application 613 loaded with a selected SDR definition 612C from the SDR definitions 612. The selected SDR definition allows for the extraction of unprocessed sensor data 692 from the unprocessed downlink data 690. In some examples, the system manager 610 can select the SDR definition based on a header included in the unprocessed downlink data 690 that identifies the form (e.g., of the satellite source, the satellite provider, etc.). In other examples, the system manager 610 can select the SDR definition based on the selection of a satellite or satellite provider included in the tasking request or tasking response. The SDR definition to process the transmission can be associated with the satellite or satellite provider in the satellite data 616. In any case, the system manager 610 can select the SDR definition to load to the SDR application 613 to extract the unprocessed sensor data 692 from the unprocessed downlink data 690.

At circle 8, the system manager 610 can then select and cause the execution of an SDP application 615 associated with the unprocessed sensor data 692 to generate the consumable payload data 694. In some examples, the system manager 610 selects the SDP application 615 from the SDP applications 614 based a header included in the unprocessed sensor data E92. In other examples, the system manager 610 can select the SDP application 615 from the SDP applications 614 based on the selection of a satellite or satellite provider included in the tasking request or tasking response. The SDP application to process the unprocessed sensor data can be associated with the satellite or satellite provider in the satellite data 616. The SDP application 615 generates the consumable payload data 694 from the unprocessed sensor data 692.

In some examples, the execution of the SDR application 613 and/or the SDP application 615 is performed at least in part by one or more special-purpose processors included with the mobile ground station.

At circle 9, the system manager 610 can cause the cause the display of the consumable payload 694 (e.g., via a display device 560, whether connected to or integrated with the mobile ground station, or to a display of another electronic device in communication with the mobile ground station via the network interface 535) to allow a user to view the data responsive to the tasking request.

In some examples, execution of various software in the above process flow, such as the SDR application 612B, the SDR application 612A, and/or the SDP application 615 is performed within one or more virtualized compute environments 699. Virtual compute environments can include, for example, virtual machines, containers, and the like. In such cases, the system manager 610 can include a hypervisor (e.g., to coordinate virtual machines), an orchestrator (e.g., to coordinate containers), and/or other virtualization technologies.

Figure 7:
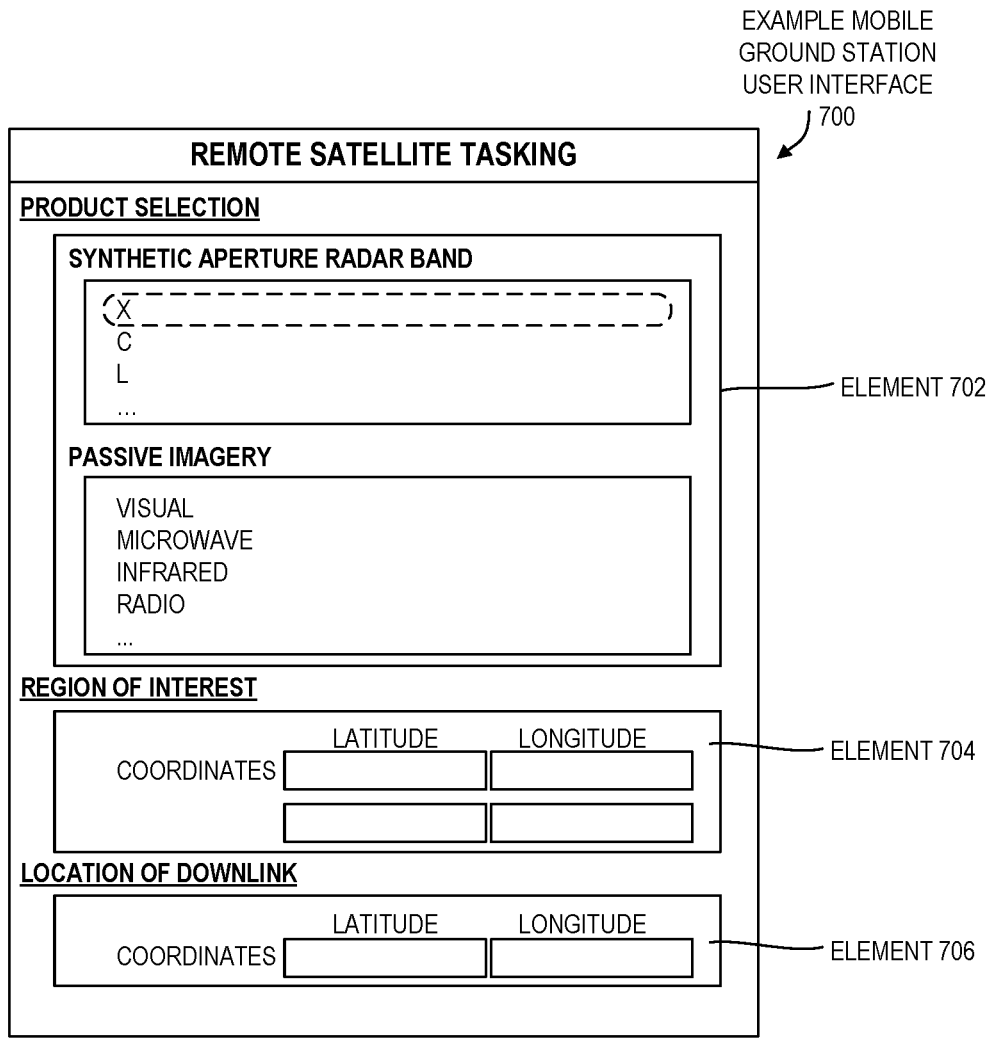
FIG. 7 illustrates aspects of a user interface associated with an example mobile ground station computer system according to some examples.

FIG. 7 illustrates aspects of a user interface associated with an example mobile ground station computer system according to some examples. The system manager of FIG. 6 can include instructions to cause the display of various user interfaces through which a user can interact with the mobile ground station (e.g., via display device 560 or another device connected via a network interface 535 such as a handheld device, laptop, etc.). An example user interface 700 includes elements 702, 704, and 706. Element 702 displays a product selection menu listing a set of available satellite sensor data collection options, allowing a user to select one of the options via an input device. While the menu includes requests based on observation characteristics, other examples may display a list of satellite providers and/or satellites, each having a set of capabilities known by or presented to the user. Element 704 displays an input field allowing a user to specify the region of interest for the satellite observation, again via an input device. In this example, a pair of latitude and longitude coordinates may be entered to specify two corners of a rectangular region. Alternatives might include the display of a map element to allow a user to draft a cursor across a region to select a region of interest. Element 706 displays an input field allowing a user to specify where the downlink should occur, again via an input device, and again as a set of latitude and longitude coordinates of the expected location of the mobile ground station at the time of the downlink. In some examples, the element 706 may be pre-populated based on current GPS coordinates obtained from a GPS receiver by the system manager.

Figure 8:
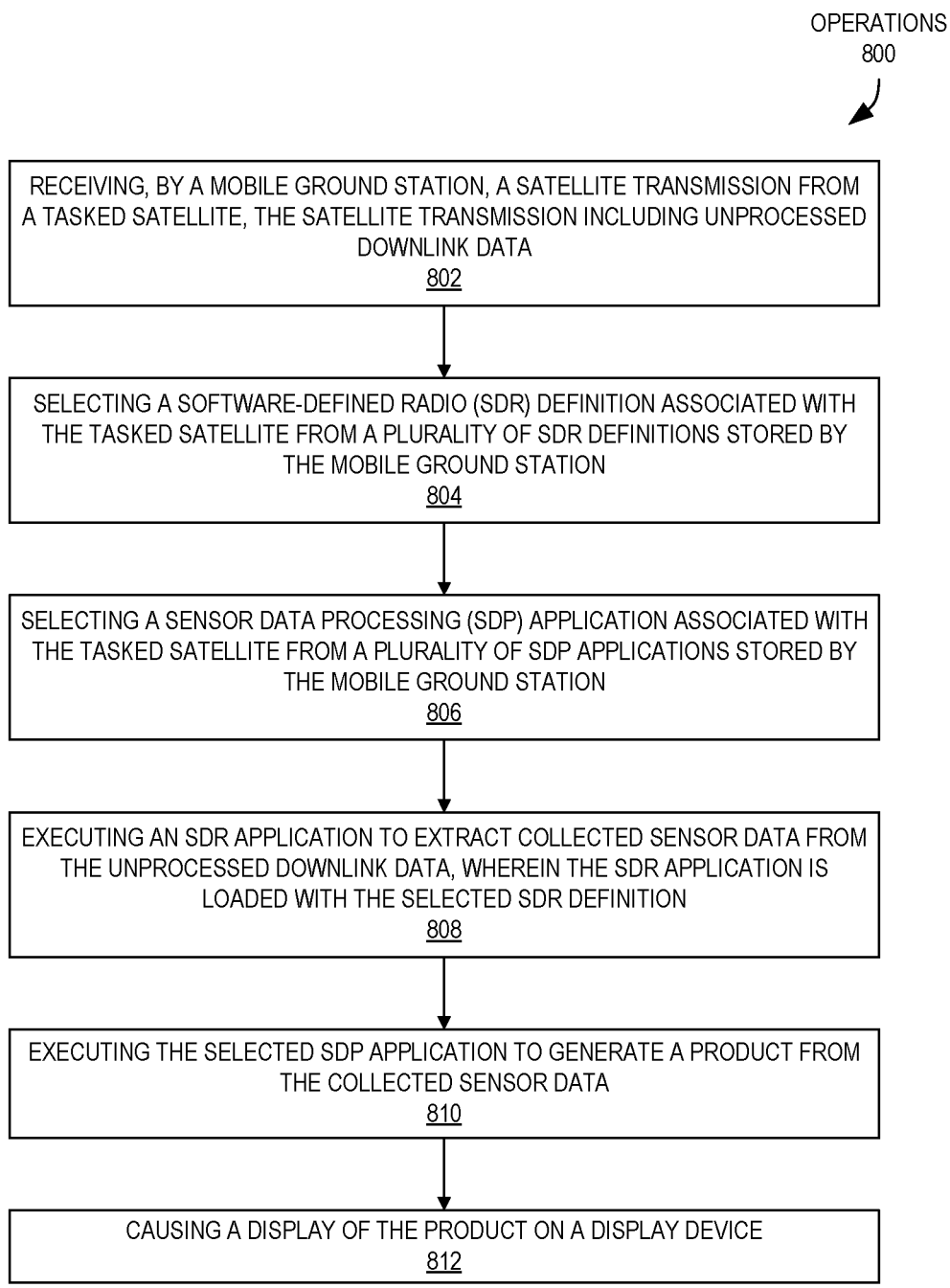
FIG. 8 is a flow diagram illustrating operations of a method for the processing of satellite sensor data by a mobile ground station according to some examples.

FIG. 8 is a flow diagram illustrating operations of a method for the processing of satellite sensor data by a mobile ground station according to some examples. Some or all of the operations 800 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 800 are performed by a mobile ground station of the other figures.

The operations 800 include, at block 802, receiving, by a mobile ground station, a satellite transmission from a tasked satellite, the satellite transmission including unprocessed downlink data.

The operations 800 further include, at block 804, selecting a software-defined radio (SDR) definition associated with the tasked satellite from a plurality of SDR definitions stored by the mobile ground station;

The operations 800 further include, at block 806, selecting a sensor data processing (SDP) application associated with the tasked satellite from a plurality of SDP applications stored by the mobile ground station;

The operations 800 further include, at block 808, executing an SDR application to extract collected sensor data from the unprocessed downlink data, wherein the SDR application is loaded with the selected SDR definition;

The operations 800 further include, at block 810, executing the selected SDP application to generate a product from the collected sensor data; and The operations 800 further include, at block 812, causing a display of the product on a display device.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 230A-230N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
sending a satellite tasking request via a first communications path to a tasking service of a provider network to task an earth observation satellite with data collection, the satellite tasking request including an identification of a region of interest from which to collect sensor data and an identification of a downlink location of a mobile ground station to which to transmit collected sensor data;
receiving, by the mobile ground station, a satellite transmission including unprocessed downlink data, the satellite transmission received from a tasked earth observation satellite via a second communications path, the second communications path being a satellite downlink from the tasked earth observation satellite to the mobile ground station as the tasked earth observation satellite passes over the downlink location;
selecting a software-defined radio (SDR) definition associated with the tasked earth observation satellite from a plurality of SDR definitions stored by the mobile ground station;
selecting a sensor data processing (SDP) application associated with the tasked earth observation satellite from a plurality of SDP applications stored by the mobile ground station;
executing, in one or more virtualized environments:
(a) an SDR application to extract collected sensor data from the unprocessed downlink data, wherein the collected sensor data represents data collected over the region of interest, and wherein the SDR application is loaded with the selected SDR definition;

(b) the selected SDP application to generate an image from the collected sensor data; and causing a display of the image on a display device.

2. The computer-implemented method of claim 1, wherein the first communications path is at least one of (a) a terrestrial radio communications network or (b) a satellite communications network having less downlink bandwidth than the second communications path.

3. The computer-implemented method of claim 1, wherein the downlink location is at least one of (a) a present location of the mobile ground station or (b) an expected location of the mobile ground station at a future point in time.

4. A computer-implemented method comprising:

receiving, by a mobile ground station, a satellite transmission from a tasked satellite, the satellite transmission including unprocessed downlink data, wherein the tasked satellite transmitted the satellite transmission according to a downlink location configured for a task, the downlink location comprising at least one of (a) a present location of the mobile ground station or (b) an expected location of the mobile ground station at a future point in time;

selecting a software-defined radio (SDR) definition associated with the tasked satellite from a plurality of SDR definitions stored by the mobile ground station;

selecting a sensor data processing (SDP) application associated with the tasked satellite from a plurality of SDP applications stored by the mobile ground station;

executing an SDR application to extract collected sensor data from the unprocessed downlink data, wherein the SDR application is loaded with the selected SDR definition;

executing the selected SDP application to generate a product from the collected sensor data; and causing a display of the product on a display device.

5. The computer-implemented method of claim 4, further comprising:

sending a satellite tasking request via a first communications path to task a satellite with data collection, the satellite tasking request including an identification of a region of interest from which to collect sensor data and an identification of a downlink location of the mobile ground station to which to transmit collected sensor data;

wherein the satellite transmission is received over a second communications path; and wherein the collected sensor data includes data collected by the tasked satellite over the region of interest.

6. The computer-implemented method of claim 5, wherein the first communications path is at least one of (a) a terrestrial radio communications network or (b) a satellite communications network having less downlink bandwidth than the second communications path.

7. The computer-implemented method of claim 5, wherein the satellite tasking request is sent by the mobile ground station.

8. The computer-implemented method of claim 5, further comprising causing a display of a graphical user interface on the display device, the graphical user interface including a first element to receive as input the identification of the region of interest, a second element to receive as input the identification of the downlink location, and a third element to receive as input a type of observation, wherein the type of observation is at least one of a selection of a satellite provider, a selection of a satellite, or a selection of a sensor type.

9. The computer-implemented method of claim 4, wherein the selection of the SDR definition associated with the tasked satellite is based on at least one of (a) a selection of the tasked satellite or of a provider of the tasked satellite sent in a satellite tasking request or (b) an indication of the tasked satellite or of the provider of the tasked satellite received in a tasking response.

10. The computer-implemented method of claim 4, wherein the selection of the SDP application associated with the tasked satellite is based on at least one of (a) a selection of the tasked satellite or of a provider of the tasked satellite sent in a satellite tasking request or (b) an indication of the tasked satellite or of the provider of the tasked satellite received in a tasking response.

11. The computer-implemented method of claim 4, wherein the collected sensor data is at least one of synthetic aperture radar returns, visible spectrum sensor data, microwave sensor data, or infrared sensor data.

12. The computer-implemented method of claim 4, further comprising:

receiving a satellite tasking response via a first communications path, the satellite tasking response including an indication of the tasked satellite, causing a satellite antenna to track an orbit of the tasked satellite as it passes overhead of the mobile ground station; and wherein the satellite transmission is received over a second communications path.

13. A mobile ground station comprising:

one or more processors; and a memory, the memory including instructions that upon execution cause the one or more processors to:

select a software-defined radio (SDR) definition associated with a tasked satellite from a plurality of SDR definitions stored by the mobile ground station;

select a sensor data processing (SDP) application associated with the tasked satellite from a plurality of SDP applications stored by the mobile ground station;

receive a satellite transmission from the tasked satellite, the satellite transmission including unprocessed downlink data, wherein the tasked satellite transmitted the satellite transmission according to a downlink location configured for a task, the downlink location comprising at least one of (a) a present location of the mobile ground station or (b) an expected location of the mobile ground station at a future point in time;

execute an SDR application to extract collected sensor data from the unprocessed downlink data, wherein the SDR application is loaded with the selected SDR definition;

execute the selected SDP application to generate a product from the collected sensor data; and cause a display of the product on a display device.

14. The mobile ground station of claim 13, the memory including further instructions that upon execution cause the one or more processors to:

send a satellite tasking request via a first communications path to task a satellite with data collection, the satellite tasking request including an identification of a region of interest from which to collect sensor data and an identification of a downlink location of the mobile ground station to which to transmit collected sensor data;

wherein the satellite transmission is received over a second communications path; and wherein the collected sensor data includes data collected by the tasked satellite over the region of interest.

15. The mobile ground station of claim 14, wherein the first communications path is at least one of (a) a terrestrial radio communications network or (b) a satellite communications network having less downlink bandwidth than the second communications path.

16. The mobile ground station of claim 14, the memory including further instructions that upon execution cause the one or more processors to cause a display of a graphical user interface on the display device, the graphical user interface including a first element to receive as input the identification of the region of interest, a second element to receive as input the identification of the downlink location, and a third element to receive as input a type of observation, wherein the type of observation is at least one of a selection of a satellite provider, a selection of a satellite, or a selection of a sensor type.

17. The mobile ground station of claim 13, wherein the selection of the SDR definition associated with the tasked satellite is based on at least one of (a) a selection of the tasked satellite or of a provider of the tasked satellite sent in a satellite tasking request or (b) an indication of the tasked satellite or of the provider of the tasked satellite received in a tasking response.

18. The mobile ground station of claim 13, wherein the selection of the SDP application associated with the tasked satellite is based on at least one of (a) a selection of the tasked satellite or of a provider of the tasked satellite sent in a satellite tasking request or (b) an indication of the tasked satellite or of the provider of the tasked satellite received in a tasking response.

\* \* \* \* \*